(12) United States Patent

Vu et al.

(10) Patent No.: US 8,252,461 B2
(45) Date of Patent: Aug. 28, 2012

(54) LITHIUM-SULFUR BATTERY AND CATHODE THEREFORE

(75) Inventors: Viet Vu, Carl Junction, MO (US); Ramanathan Thillaiyan, Webb City, MO (US); Mai Sayarath, Webb City, MO (US); Ernest Mdzebet, Joplin, MO (US); Umamaheswari Viswanathan, Webb City, MO (US)

(73) Assignee: Eaglepicher Technologies, LLC, Joplin, MO (US)

( * ) Notice: Subject to any disclaimer, the term of this patent is extended or adjusted under 35 U.S.C. 154(b) by 668 days.

(21) Appl. No.: 12/396,118

(22) Filed: Mar. 2, 2009

(65) Prior Publication Data

US 2009/0226809 A1    Sep. 10, 2009

Related U.S. Application Data

(60) Provisional application No. 61/034,052, filed on Mar. 5, 2008.

(51) Int. Cl.
*H01M 4/00* (2006.01)
*H01M 4/13* (2010.01)

(52) U.S. Cl. .................................................. 429/220

(58) Field of Classification Search .................. None
See application file for complete search history.

(56) References Cited

U.S. PATENT DOCUMENTS

| | | | |
|---|---|---|---|
| 4,419,422 A * | 12/1983 | Leger et al. ................. | 429/336 |
| 4,950,565 A * | 8/1990 | Schisselbauer et al. ...... | 429/116 |
| 6,210,831 B1 * | 4/2001 | Gorkovenko et al. ........ | 429/213 |
| 6,716,372 B2 | 4/2004 | Barker et al. | |
| 6,733,924 B1 | 5/2004 | Skotheim et al. | |
| 6,797,428 B1 | 9/2004 | Skotheim et al. | |
| 6,936,381 B2 | 8/2005 | Skotheim et al. | |
| 7,247,408 B2 | 7/2007 | Skotheim et al. | |
| 7,276,218 B2 | 10/2007 | Barker et al. | |
| 2004/0091776 A1 | 5/2004 | Hwang | |
| 2005/0042503 A1 * | 2/2005 | Kim et al. ................. | 429/137 |
| 2005/0084755 A1 * | 4/2005 | Boone et al. .............. | 429/220 |
| 2007/0190427 A1 * | 8/2007 | Carlson et al. ............. | 429/251 |

FOREIGN PATENT DOCUMENTS

| | | |
|---|---|---|
| KR | 20040011629 A | 2/2004 |
| KR | 20040033678 A | 4/2004 |
| KR | 00100766967 B1 | 10/2007 |
| WO | 9933131 A1 | 7/1999 |
| WO | 0139303 A1 | 5/2001 |

OTHER PUBLICATIONS

Communication relating to the result of the Partial International Search for PCT/US2009/035723, dated Nov. 16, 2009, 4 pages.
Michot et al, "Adsorption of Chlorinated Phenols from Aqueous Solution by Surfactant-Modified Pillared Clays," Clays and Clay Minerals, vol. 39, No. 6, pp. 634-641, 1991.

* cited by examiner

*Primary Examiner* — Emily Le
*Assistant Examiner* — Michael Forrest
(74) *Attorney, Agent, or Firm* — Oliff & Berridge, PLC

(57) ABSTRACT

An improved cathode suitable for lithium-sulfur batteries, a battery including the cathode, and a battery including a separator containing inorganic fillers are disclosed. The cathode includes sulfur and a metal oxide and optionally includes an additional polymeric material. The metal oxide reduces dissolution of sulfur at the cathode and reduces sulfur-containing deposits on the battery anode, thereby providing a battery with relatively high energy density and good partial discharge performance. The separator also reduces unwanted diffusion of sulfur species.

19 Claims, 10 Drawing Sheets

LITHIUM-SULFUR BATTERY AND CATHODE THEREFORE

CROSS REFERENCE TO RELATED APPLICATIONS

This application claims the benefit of Provisional Application No. 61/034,052, filed Mar. 5, 2008, entitled Lithium-Sulfur Primary and Reserve Batteries.

FIELD OF INVENTION

The present invention generally relates to battery technology. More particularly, the invention relates to lithium-sulfur batteries and cathodes therefore, and to methods of forming and using the batteries.

BACKGROUND OF THE INVENTION

As lighter, smaller portable electronic devices with increasing functionality are developed, there is generally a corresponding increasing demand for smaller, lighter batteries with increased energy density to power the devices. Such batteries can be used in commercial applications, such as portable notebooks and computers, digital and cellular phones, personal digital assistants, and the like, and higher energy applications, such as hybrid and electric cars, and military or defense applications.

Lithium sulfur batteries have been developed to address some of these concerns. Lithium sulfur batteries are rechargeable, have a relatively high energy density and specific power, are relatively light, can operate over a wide temperature range (about −50° C. to about 70° C.), use relatively inexpensive cathode materials (sulfur), and are relatively safe for the environment, compared to other battery technologies such as nickel metal hydride (NiMH), lithium ion, nickel cadmium (Ni—Cd), and lead acid batteries.

Lithium sulfur batteries generally include a lithium anode, an electrolyte, a porous separator, and a sulfur cathode. In a discharge operation of the battery, the lithium anode is oxidized to form lithium ions, while the sulfur cathode is reduced to form polysulfides, which are soluble products. During a charging operation, polysulfides are oxidized to form solid sulfur.

Unfortunately, with conventional lithium-sulfur batteries, the sulfur cathode discharge products, polysulfides, may migrate through the separator and react on a surface of the anode, causing further performance and capacity degradation.

Various attempts have been made to address these issues with conventional lithium-sulfur batteries. One technique includes modifying the electrolyte to attempt to provide additional sulfur for the electrochemical reaction, and another technique includes providing a protective sheath around the anode. Neither approach has been completely successful. Modified electrolyte solutions fail to completely control polysulfide solubility, and protective lithium anode layers have other undesirable effects on the electrochemical characteristics of the battery. Accordingly, improved lithium-sulfur batteries and components thereof are desired.

SUMMARY OF THE INVENTION

The present invention provides an improved lithium-sulfur battery, a cathode for a lithium-sulfur battery, and methods of forming the cathode and battery. The ways in which the present invention addresses the drawbacks of prior-art batteries will be discussed in greater detail below. In general, the batteries of the present invention exhibit increased energy density and specific energy, compared to traditional lithium-sulfur batteries. In addition, the batteries are relatively safe and affordable, compared to other battery technologies.

In accordance with various embodiments of the invention, a battery includes an anode containing lithium, a cathode containing sulfur and a metal oxide, a separator, and an electrolyte. As explained in greater detail below, the metal oxide serves to improve the performance of the battery by holding polysulfides within the cathode structure. As a result, the cathode discharge efficiency increases and the lithium-sulfur cell delivers longer service life. In addition, an amount of polysulfides that might otherwise migrate to the anode and passivate the anode is expected to be significantly reduced. In general, the metal oxides are selected from materials that are generally compatible with materials typically used in the manufacture of batteries. In accordance with various aspects of these embodiments, the metal of the metal oxide is selected from Group I and Group II metals, for example, metals capable of a +2 or +3 valence state. Suitable exemplary metal oxides include: $CuO$, $Bi_2O_3$, $SnO$, $ZnO$, and $Mn_2O_3$. In accordance with additional aspects of these embodiments, the cathode further includes a polymeric material to further reduce the diffusion of polysulfides towards the anode. The use of metal oxide and/or the polymer as a cathode additive improves the discharge performance of lithium-sulfur cells. In accordance with additional aspects of these embodiments, a lithium-sulfur cell further includes a separator containing an inorganic additive as means to further mitigate or prevent polysulfides from migrating towards the lithium anode. The separator can be made from, for example, polymers such as polyvinylidene fluoride (PVDF), polyvinylidene fluoride-co-hexafluoropropylene (PVDF-HFP), polyethylene (PE), polypropylene (PP), or similar polymers and inorganic additives such as clays or organically modified clays (e.g., clays including cationically or anionically or chemically modified surface functional group(s)).

In accordance with additional embodiments of the invention, a battery includes an anode containing lithium, a cathode containing sulfur, an electrolyte, and a separator, including a polymer and inorganic additives such as clays or organically modified clays. In accordance with various aspects of these embodiments, the cathode includes a metal oxide selected from materials that are generally compatible with materials typically used in the manufacture of batteries, including Group I and Group II metals, such as metals capable of a +2 or +3 valence state. Suitable exemplary metal oxides include: $CuO$, $Bi_2O_3$, $SnO$, $ZnO$, and $Mn_2O_3$. In accordance with additional aspects of these embodiments, the cathode further includes a polymeric material to further reduce the diffusion of polysulfides towards the anode.

In accordance with further exemplary embodiments of the invention, a battery includes an anode containing lithium, a cathode containing sulfur, and an electrolyte physically separated from the electrodes by a barrier. The barrier is ruptured or otherwise broken prior to battery use to allow the electrolyte to contact the electrodes. Use of such a barrier increases the storage life of the battery. In accordance with various aspects of these embodiments, the cathode further includes a metal oxide, such as those described herein. In accordance with yet additional aspects, the cathode includes a polymeric material, such as polyamide materials. And, in accordance with yet further aspects, the battery further includes a separator, including inorganic fillers such as clay or organically modified clay.

In accordance with yet additional embodiments of the invention, a cathode for use in lithium-sulfur batteries includes sulfur and a metal oxide. In accordance with various aspects of these embodiments, the cathode includes a metal oxide selected from materials that are generally compatible with materials typically used in the manufacture of batteries, including Group I and Group II metals, such as metals capable of a +2 or +3 valence state. Suitable exemplary metal oxides include: CuO, $Bi_2O_3$, SnO, ZnO, and $Mn_2O_3$. In accordance with additional aspects of these embodiments, the cathode further includes a polymeric material, such as polyamide material, to further reduce the diffusion of polysulfides towards the anode. In accordance with further aspects of the embodiments, the cathode includes a separator, including inorganic fillers such as clay or organically modified clay.

In accordance with yet additional embodiments of the invention, a cathode for use in lithium-sulfur batteries includes sulfur and a separator, including inorganic additives, such as clays or organically modified clays. In accordance with various aspects of these embodiments, the cathode further includes a metal oxide selected from materials that are generally compatible with materials typically used in the manufacture of batteries, including Group I and Group II metals, such as metals capable of a +2 or +3 valence state. Suitable exemplary metal oxides include: CuO, $Bi_2O_3$, SnO, ZnO, and $Mn_2O_3$. In accordance with additional aspects of these embodiments, the cathode further includes a polymeric material, such as polyamide material, to further reduce the diffusion of polysulfides towards the anode.

According to various embodiments described herein, a cathode may also include a binder, for example, a polymeric binder such as polytetrafluoroethylene (PTFE) or polyvinylidene fluoride (PVDF). Additionally, carbon materials such as carbon black, synthetic graphite including expanded graphite, graphite nanosheets, graphite nanoplatelet, graphene sheets, non-synthetic graphite (including natural graphite and coke) and graphitized carbon nano-fibers, may be used as conductive fillers in the cathodes.

In accordance with yet additional embodiments of the invention, a method of forming a cathode includes providing a substrate; preparing a mixture including a solvent, a binder, sulfur, electrically conductive carbon and a metal oxide to form a slurry; coating the slurry onto the substrate; and allowing the solvent to evaporate. In accordance with further aspects of the embodiments, a polymeric material is added to the slurry, prior to coating. In accordance with yet further aspects, a separator is attached to the cathode.

In accordance with yet additional embodiments of the invention, a method of forming a cathode includes providing a substrate; preparing a mixture including a solvent, a binder, sulfur, and electrically conductive carbon to form a slurry; coating the slurry onto the substrate; allowing the solvent to evaporate, and forming a separator, including inorganic filler, on at least a portion of the cathode. In accordance with further aspects of the embodiments, a polymeric material and/or a metal oxide is added to the slurry, prior to coating.

In accordance with yet additional embodiments of the invention, a method of forming a battery includes providing an anode and preparing a cathode by providing a substrate; preparing a mixture including a solvent, a binder, sulfur, and electrically conductive carbon to form a slurry; coating the slurry onto the substrate; and allowing the solvent to evaporate. In accordance with further aspects of the embodiments, metal oxide and/or polymeric material is added to the slurry, prior to coating the substrate. In accordance with additional aspects, the method of forming a battery further includes forming a separator, including inorganic additives, such as clays or organically modified clays, interposed between the anode and the cathode.

BRIEF DESCRIPTION OF THE DRAWINGS

A more complete understanding of the present invention may be derived by referring to the detailed description and claims, considered in connection with the figures, wherein like reference numbers refer to similar elements throughout the figures, and:

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

The present invention provides lithium-sulfur batteries having improved performance, compared to conventional lithium-sulfur batteries. The lithium sulfur batteries and components thereof of the present invention can be used in a variety of applications, in which primary or secondary batteries are used, such as automotive, transportation, personal safety and security, remote monitoring, law enforcement, utilities and metering, and military and aerospace applications. As set forth in more detail below, the batteries of the present invention have a higher specific energy, a higher energy density, have better discharge performance, and have a longer shelf life compared to traditional lithium-sulfur batteries.

Figure 1:
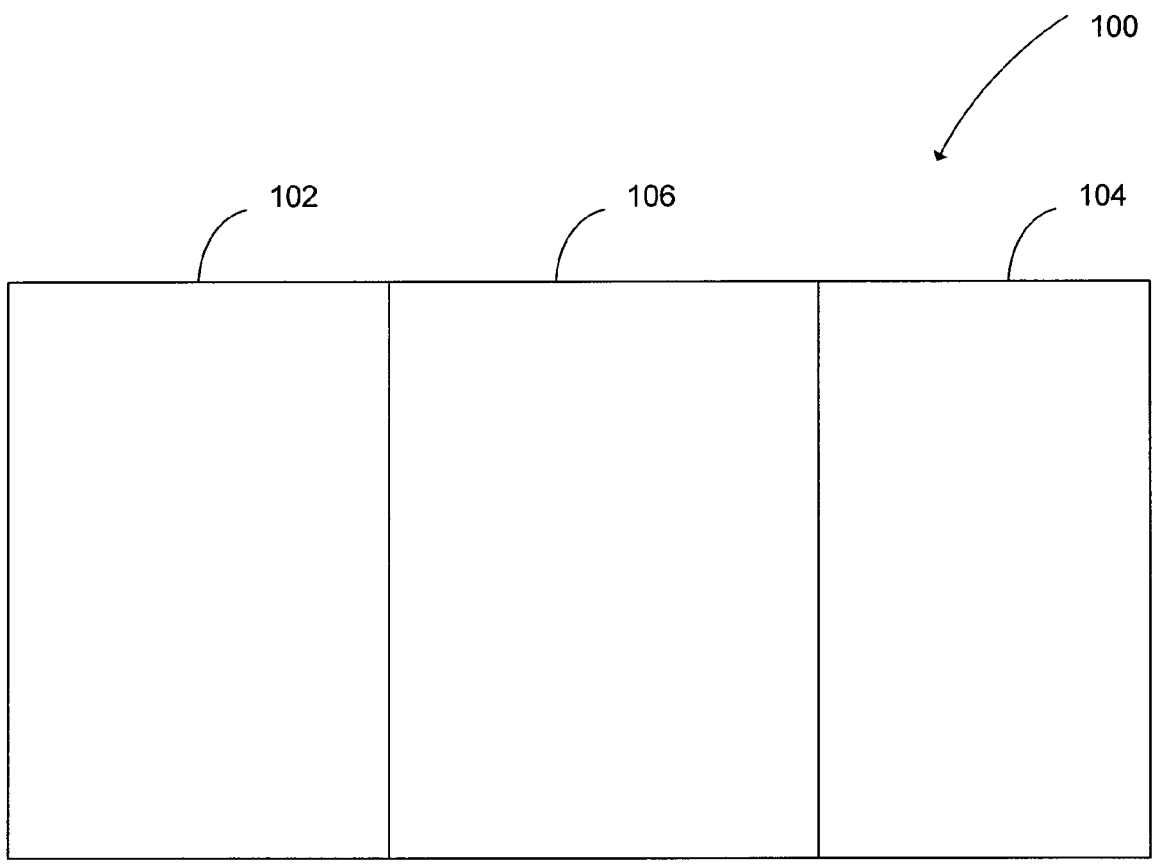
FIG. 1 illustrates a lithium-sulfur battery in accordance with various embodiments of the invention.

FIG. 1 illustrates a cross-section of an exemplary battery 100 in accordance with various embodiments of the invention. Battery 100 generally includes an anode 102, a cathode 104, an ion conductor (not illustrated), and one or more electrolyte separators 106. As used herein, the terms "anode" and "cathode" are used to describe the respective electrodes in a discharge or use operation of the battery. Batteries in accordance with various embodiments of the invention may also include current collectors, terminals, and casings, which are not illustrated.

Anode 102 includes lithium metal, lithium ions, and/or one or more lithium alloys such as lithium aluminum alloys, lithium silicon alloys, and lithium tin alloys. Additional materials suitable for anode 102 include lithium carbon, Li—$Sn_2O_3$, and Li—$SnO_2$ based materials. The materials may be in various forms, such as foils or pressed-powder sheets. The anode may also include an embedded current collector, not illustrated.

An exemplary anode 102 includes lithium or a lithium alloy. By way of one particular example, anode 102 includes a lithium metal foil. Anode 102 may optionally include a protective layer (e.g., a separator), which allows lithium ions to migrate from anode 102 to ion conductor 106 and back to anode 102, respectively, during discharging and charging of the battery.

In accordance with various embodiments of the present invention, cathode 104 includes sulfur, a metal oxide, a binder and electrically conductive additives such as carbon black and graphite. The cathode may additionally include a substrate (e.g., an aluminum substrate) and the sulfur, metal oxide, binder, and conductive additives may form a layer or coating over the substrate. In accordance with various aspects of this embodiment, the metal of the metal oxide is selected from Group I and Group II metals, such as metals capable of a +2 or +3 valence state. Suitable exemplary metal oxides include: CuO, $Bi_2O_3$, SnO, ZnO, and $Mn_2O_3$. Exemplary binders suitable for use with the cathode include a polymeric binder, such as polytetrafluoroethylene (PTFE) or polyvinylidene fluoride (PVDF), and exemplary conductive materials include carbon black, synthetic graphite including expanded graphite, graphite nanosheets, graphite nanoplatelet, graphene sheets, non-synthetic graphite (including natural graphite and coke) and graphitized carbon nano-fibers.

Table 1 below lists various exemplary metal oxides, suitable for use with cathode 104, and their corresponding properties and overall reactions with sulfur and a lithium anode.

TABLE 1

| Metal Oxide | Reactions | $E^0$ V | ΔG Kcal/mole | Specific Capacity Ah/g ($M_xO_y$ + S) | Density g/cc |
|---|---|---|---|---|---|
| CuO | $4 Li + CuO + S = Li_2O + Cu + Li_2S$ | 2.22 | −205 | 0.962 | 3.85 |
| $Bi_2O_3$ | $12 Li + Bi_2O_3 + 3 S = 3 Li_2O + 2 Bi + 3 Li_2S$ | 2.12 | −587 | 0.572 | 5.82 |
| SnO | $4 Li + SnO + S = Li_2O + Sn + Li_2S$ | 1.89 | −174 | 0.643 | 4.48 |
| ZnO | $4 Li + ZnO + S = Li_2O + Zn + Li_2S$ | 1.73 | −159 | 0.946 | 3.67 |
| $Mn_2O_3$ | $10 Li + Mn_2O_3 + 2 S = 3 Li_2O + 2Mn + 2 Li_2S$ | 1.70 | −392 | 1.208 | 3.45 |

A particular metal oxide for use with cathode 104 may be selected based on an intended application, since the addition of metal oxide(s) will alter the potential of the battery. In addition, an amount of metal oxide(s) in cathode 104 material may be selected according to desired battery properties. In accordance with various embodiments of the invention, the cathode includes about 20% to about 90%, or about 30% to about 80%, or about 50% to about 70% sulfur and about 0.001% to about 50%, or about 10% to about 35%, or about 20% to about 25% metal oxide. By way of particular examples, when the metal oxide is zinc oxide, the cathode may include about 20% to about 25%, zinc oxide and about 45% to about 75%, sulfur. And, when the cathode includes CuO, the CuO is present in an amount of about 20% to about 25%, and sulfur is present in an amount of about 45% to about 75%. The percents set forth above are in weight percent of the sulfur/metal oxide material—e.g., the coating on the cathode substrate. All percents set forth herein are in weight percents, unless otherwise noted.

It is believed that the metal oxide of cathode 104 reacts with sulfur or sulfur discharge products, polysulfides, to create insoluble metal sulfides or metal polysulfides. For example, the polysulfides may be physically or chemically adsorbed on the surface of the metal oxides. The formation of insoluble metal sulfides or the adsorption of polysulfides on the surface of metal oxides reduces an amount of soluble sulfur species that would otherwise migrate towards the anode. Thus, the use of metal oxide(s) as an additive contributes in holding polysulfides within the cathode, which in turn results in service life improvement of the battery or cell. In addition, less passivation due to polysulfides is expected to occur on the surface of the lithium anode. Thus, higher performance of the lithium-sulfur battery is maintained.

In accordance with additional embodiments of the invention, cathode 104 includes a polymeric material. The polymeric material preferably reacts with sulfur discharge products to form even less-soluble complexes. Exemplary polymeric materials include nitrogen-based compounds that have an affinity for sulfur soluble species and that bind to at least one sulfur discharge product. One group of compounds suitable for such polymeric material includes polyamides. One exemplary polyamide material is sold by Elementis Specialties under the trademark Thixatrol® Max. An amount of polymeric material may vary in accordance with specific applications. By way of examples, the polymeric material may be present in an amount of about 0.001% to about 10%, or about 0.25% to about 6%, or about 1 to about 2% of the sulfur-metal oxide composition or layer.

The electrolyte may include any material suitable for lithium-sulfur battery operation. In accordance with various embodiments of the invention, the electrolyte is non-aqueous. An exemplary electrolyte includes a non-aqueous electrolyte that includes a solvent system and a salt that is at least partially dissolved in the solvent system. The solvent may include an organic solvent such as polycarbonate or ether or mixtures thereof. In accordance with one embodiment, the solvent system includes 1 M $LiN(CF_3SO_2)_2$ dissolved in an aprotic solvent mixture such as a 1:1 by weight of a mixture of diethylene glycol methyl ether, and, 1,3 dioxalane. Exemplary salts suitable for use with various embodiments of the invention include lithium salts, such as, but not limited to, $LiPF_6$, $LiBF_4$, $LiAsF_6$, $LiClO_4$, $LiN(CF_3SO_2)2$, and $LiB(C_6H_4O_2)_2$. Additional exemplary electrolyte salts used with further anode materials may include the same cations as the anode metal, combined with anions such as those noted herein.

In accordance with various embodiments of the invention, separator 106 includes an inorganic additive as means to mitigate or prevent polysulfides from migrating towards the lithium anode. The separator can be made from, for example, polymers such as polyvinylidene fluoride (PVDF), polyvinylidene fluoride-co-hexafluoropropylene (PVDF-HFP), polyethylene (PE), polypropylene (PP), or similar polymers and inorganic additives such as clays or organically modified clays (e.g., clays including cationically or anionically or chemically modified surface functional group(s)). As illustrated in more detail below, batteries in accordance with various embodiments of the invention, which include inorganic material, such as clay(s), in the separator exhibit longer service life, compared to lithium-sulfur batteries with traditional separators. It is believed that the surface functional groups on clay additives within the separator reduce or stop the diffusion of polysulfides through electrostatic interactions. Exemplary separators 106 include about 1% to about 99%, or about 20% to about 95%, or about 50% to about 95% polymer and about 0.001% to about 99%, or about 1% to about 80%, or about 5% to about 50% inorganic filler.

During a discharge operation of the battery 100, lithium anode 102 is oxidized to form lithium ions, while the sulfur cathode is reduced to form polysulfides, which are soluble products. During a charging operation, polysulfides are oxidized to form solid sulfur, while the lithium ions are plated back to the anode.

Figure 2:
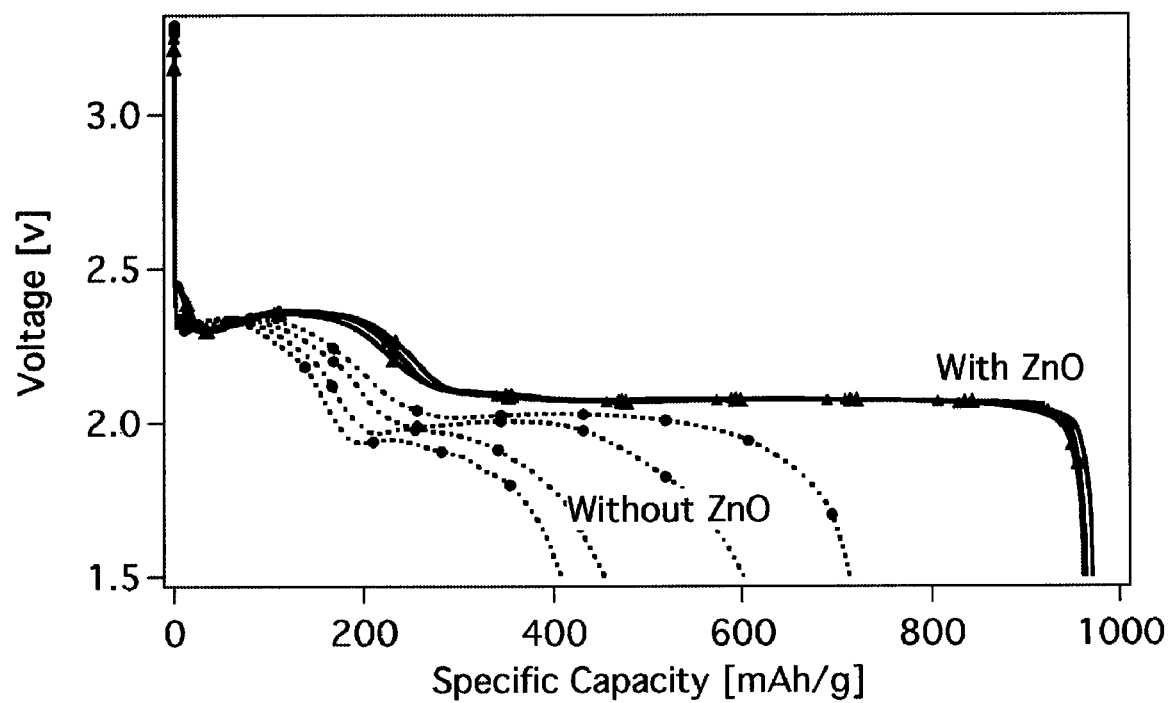
FIGS. 2 through 4 illustrate discharge characteristics of a lithium-sulfur battery in accordance with exemplary embodiments of the invention.

FIG. 2 illustrates a discharge profile at 5 mA of battery 100 with a cathode including about 23.06% ZnO, about 54.42% S, about 5.03% graphite (e.g., KS4 sold by Timcal), about 10.87% carbon black (e.g., Super P, sold by Timcal), about 6.62% binder and discharge of a similar battery without any metal oxide. As illustrated, the cells including ZnO in the cathode provide more consistent performance and a longer service life.

Figure 3:
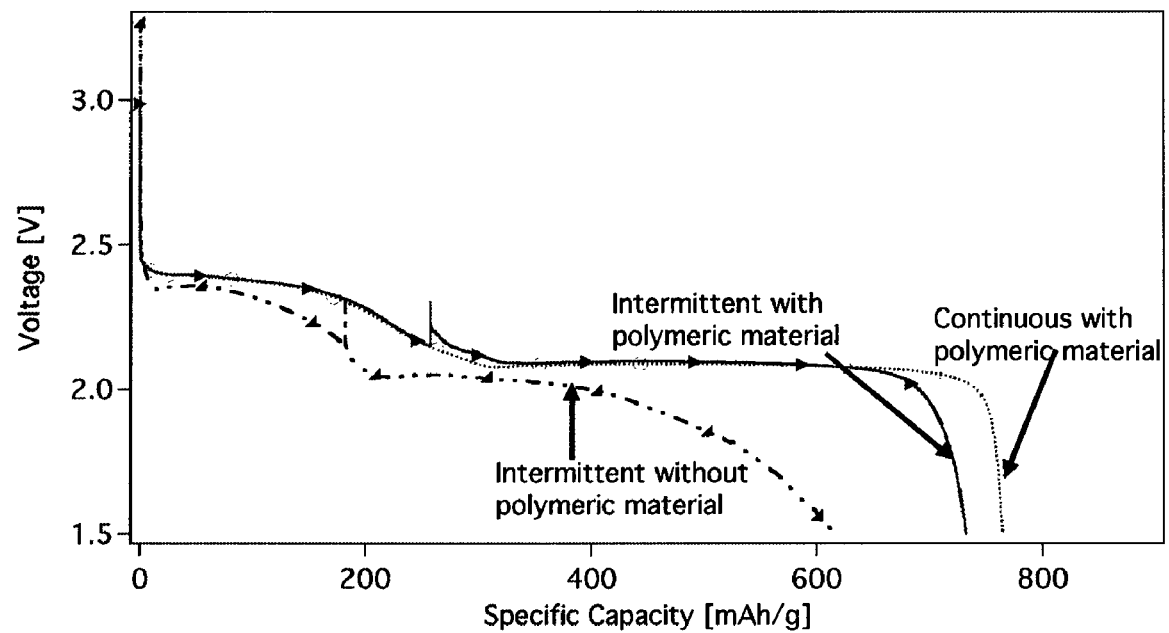

As noted above, cathode 104 may also include an additional polymer additive to bind or complex with sulfur moieties. FIG. 3 illustrates discharge performance of a battery 100, having a cathode including about 22.62% ZnO, about 53.38% S, about 5.02% graphite (e.g., KS4), about 10.86% carbon black (e.g., Super P), about 6.62% binder, and about 1.5% polyamide (e.g., Thixatrol® Max), the polymeric material and a similar battery without the polymeric additive. In the illustrated case, the batteries were discharged at 5 mA to 2.2 V, rested for 72 hours, and then discharged to about 1.5V. As shown, the addition of the polymeric material to the cathode improves the partial discharge performance of the battery. The performance of intermittent and continuous cells with cathodes that contain polyamide additive are similar, whereas the intermittent performance of a cell without the polymeric additive falls off by about seventeen percent (17%).

Figure 4:
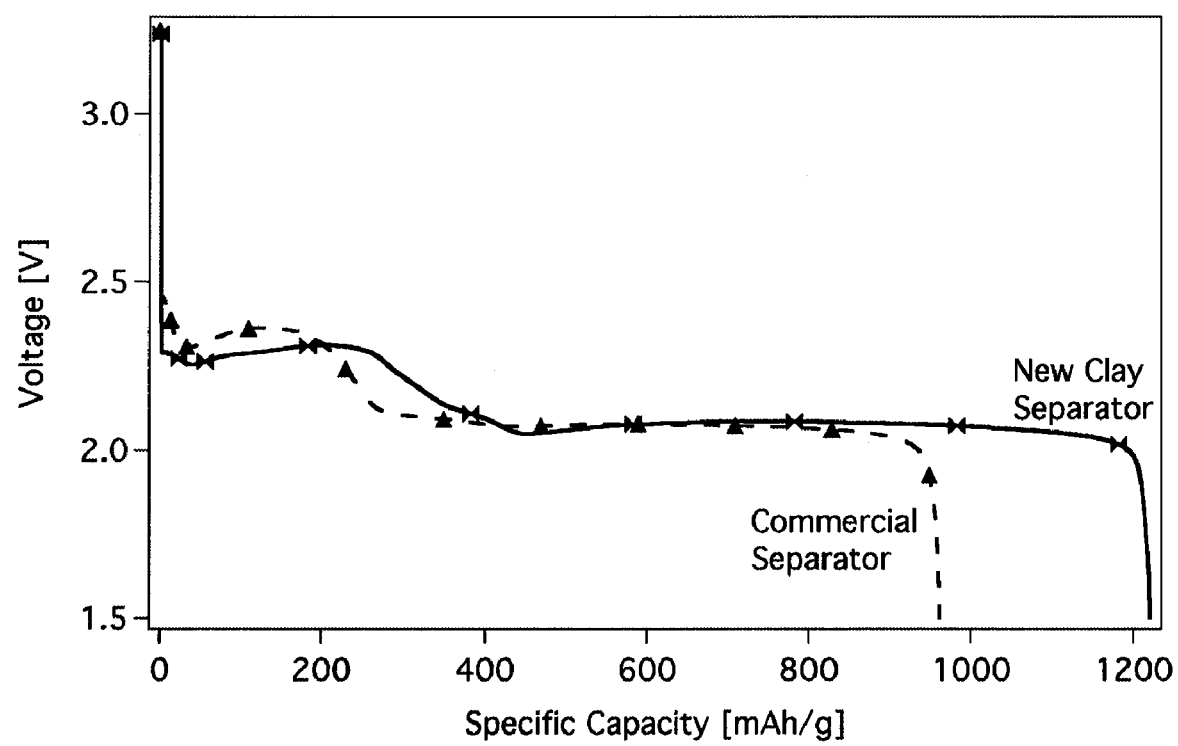

As noted above, battery 100 may include a separator containing inorganic materials such as clay(s) as means to stop or reduce the diffusion of polysulfides towards the anode. FIG. 4 illustrates the discharge profile at 5 mA of battery 100 with a cathode including about 23.06% ZnO, about 54.42% S, about 5.03% graphite (e.g., KS4), about 10.87% carbon black (e.g., Super P), about 6.62% binder and built with separator 106 containing finely dispersed clay particles. In this exemplary case, the clay is a nanoclay, specifically, montmorillonite clay surface modified with 25-30 wt % methyldihydroxyethyl hydrogenated tallow ammonium, sold by Aldrich chemicals with trade name Nanomer/34 TCN. The particles were dispersed in an organic solvent, in this case acetone using probe sonication (or shear mixing or ball milling) for 15 min in ice bath. PVDF-HFP was dissolved in acetone in a different beaker. These two solutions were mixed together and exposed to sonicate (or shear mixing or ball milling) for 30 min (in ice bath) in order to disperse clay particles in the polymeric solution. This composite solution was casted on a mold and dried at room temperature for 5 hours and followed by drying at 60° C. under vacuum for 4 hours. The separator film thickness is about 20-100 microns. FIG. 4 illustrates a discharge profile at 5 mA of the lithium-sulfur battery 100 built with a separator 106 film containing about 25% of clay in PVDF-HFP. As shown in FIG. 4, the battery delivers an average capacity to 2.2 Volts of about 1200 mAh/gm.

Turning now to FIGS. 5-10(b), reserve batteries 500 to 1000, in accordance with additional exemplary embodiments of the invention, are illustrated. Reserve batteries 500-1000 are similar to battery 100, except batteries 500-1000 include a barrier (e.g., barrier 502). As described in more detail below, the barrier provides a separation between the electrolyte and at least one of the anode and the cathode to thereby improve the stability and shelf life of the battery.

Because of the relatively benign nature of the electrolyte solvents and salts suitable for lithium-sulfur batteries, a large variety of mechanisms and materials are available for use as an electrolyte barrier. In general, the barrier material is deformable and may include materials such as metal(s) and/or plastics(s). The following examples illustrate various configurations suitable for use with exemplary reserve batteries.

Figure 5:
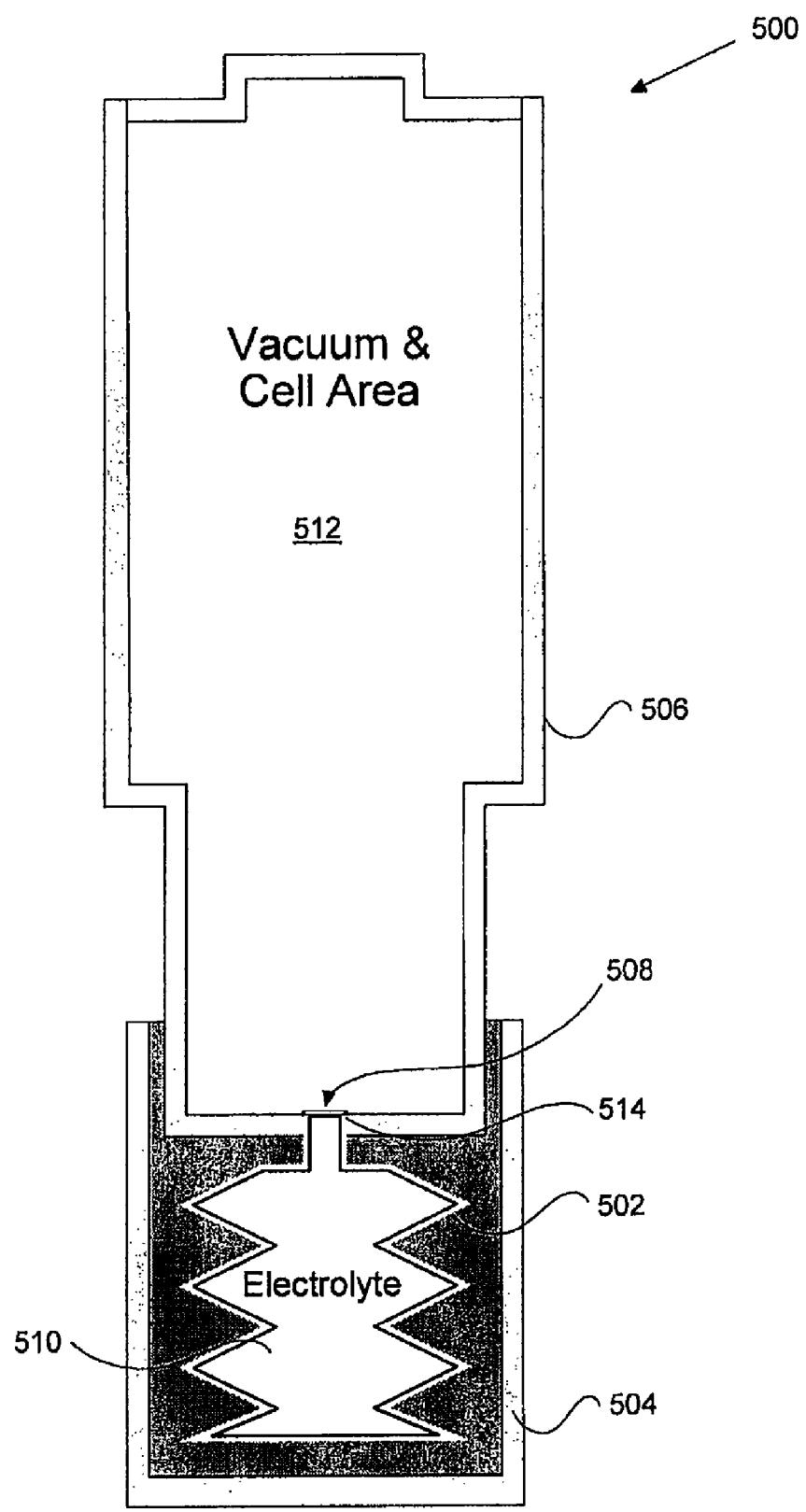
FIGS. 5 through 9, 10($a$), and 10($b$) illustrate various batteries including an electrolyte barrier in accordance with additional embodiments of the invention.

In accordance with one embodiment of this invention, illustrated in FIG. 5, a battery 500 includes a bellows 502, which serves as an electrolyte barrier, a cup 504, a casing 506, a port 508, an electrolyte 510, a cavity 512, and a ruptureable diaphragm 514 between cavity 512 and electrolyte 510. In the illustrated embodiment, bellows 502 is accordion shaped and is encased in cup 504 that is attached to cell container 506. Port 508 is sealed using rupture diaphragm 514, which is designed to fail at a certain pressure. In operation, cup 504 and bellows 502 are manually compressed, rupturing diaphragm 514 and forcing electrolyte 510, through port 508, into cell cavity 512. Cup 504 optionally mechanically locks to cell container 506 to prevent or mitigate electrolyte draining back into bellows 502.

Figure 6:
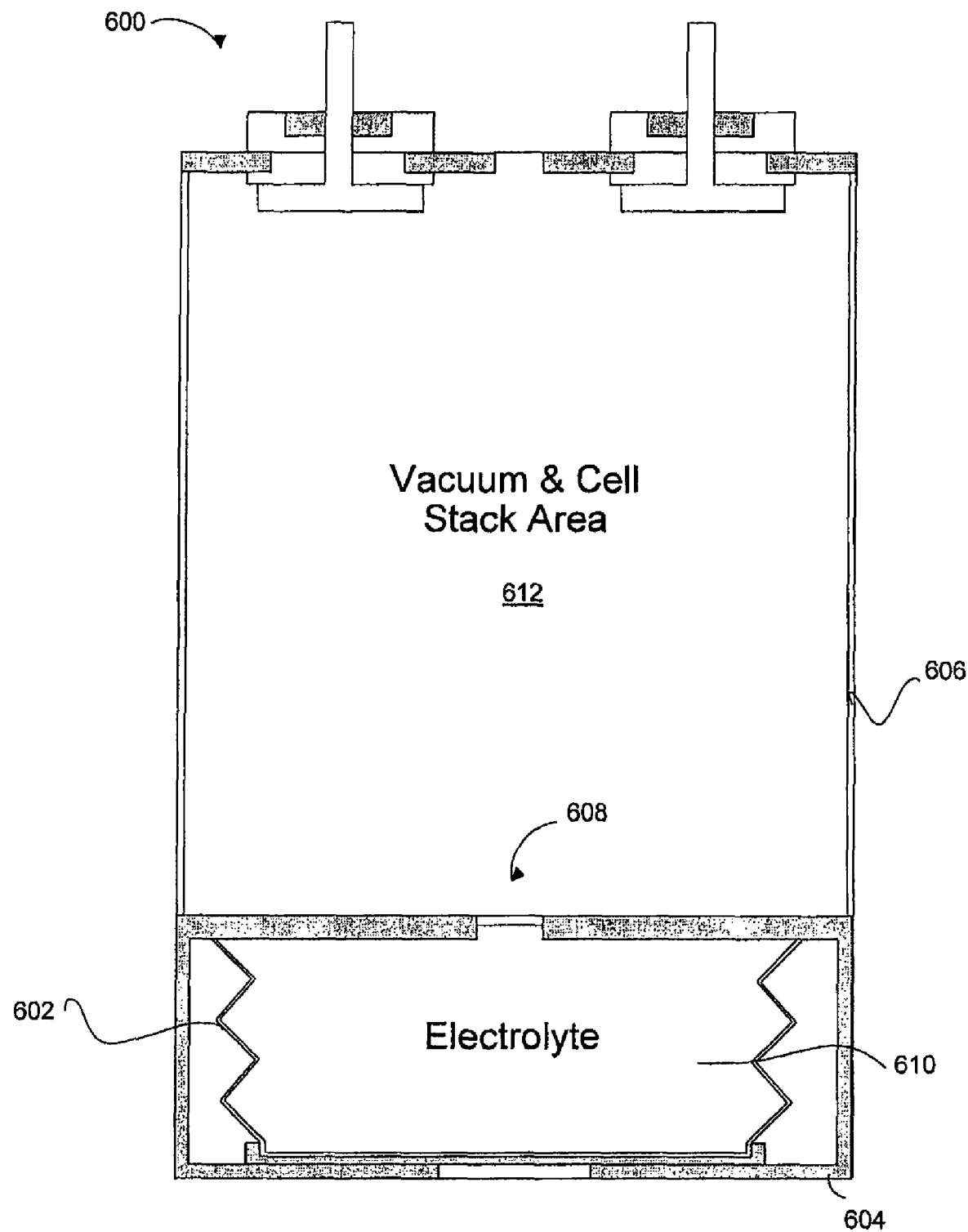
Figure 7:
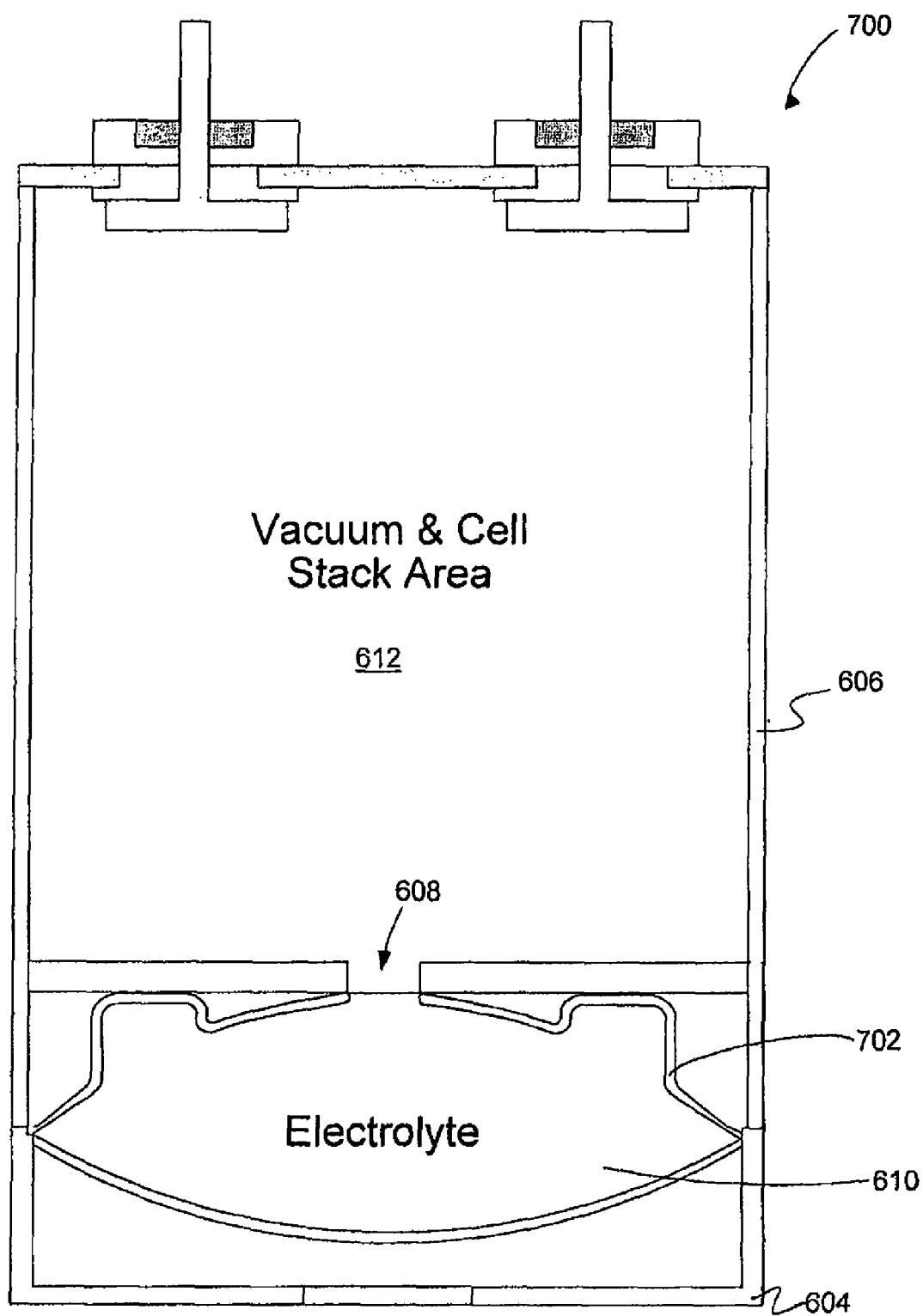

FIGS. 6 and 7 illustrate additional cells 600 and 700 in accordance with additional embodiments of the invention. Cells 600 and 700 include a bellows 602, 702, a cup 604, a casing 606, a port 608, an ion conductor 610, and a vacuum cavity 612. Cells 600 and 700 are similar to cell 500, except cell 700 includes a dome-shaped bellows 702, and cells 600 and 700 are activated using a mechanically triggered and activated, vacuum-assisted activation system.

Figure 8:
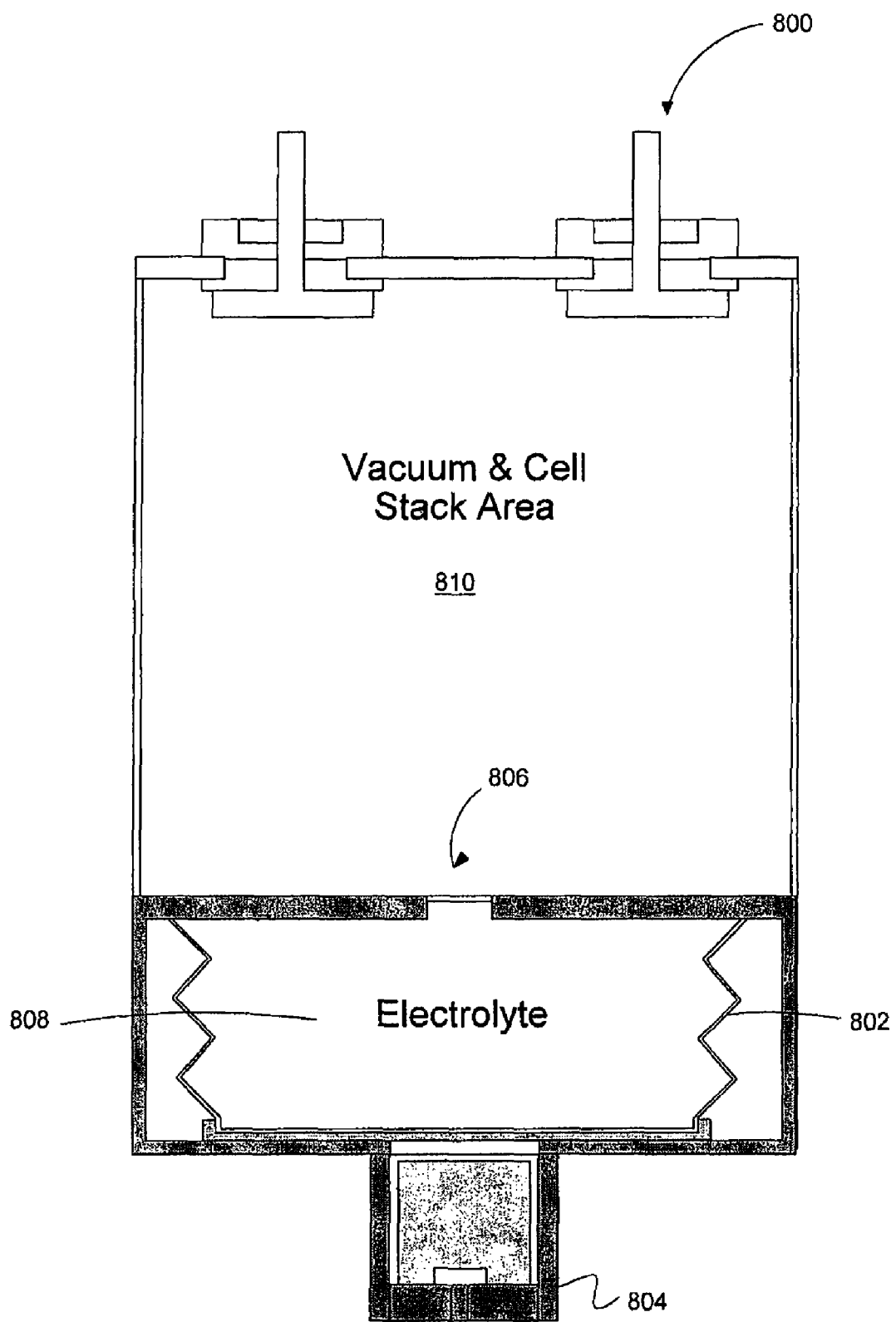

FIG. 8 illustrates another cell 800 in accordance with various embodiments of the invention. Cell 800 includes a bellows 802, a gas generator 804, a diaphragm 806, an electrolyte 808, and a cavity 810. Gas generator 804, such as a pyrotechnical gas generator, may be used to burst diaphragm 806 and cause electrolyte 808 to disperse into cavity 810.

Figure 9:
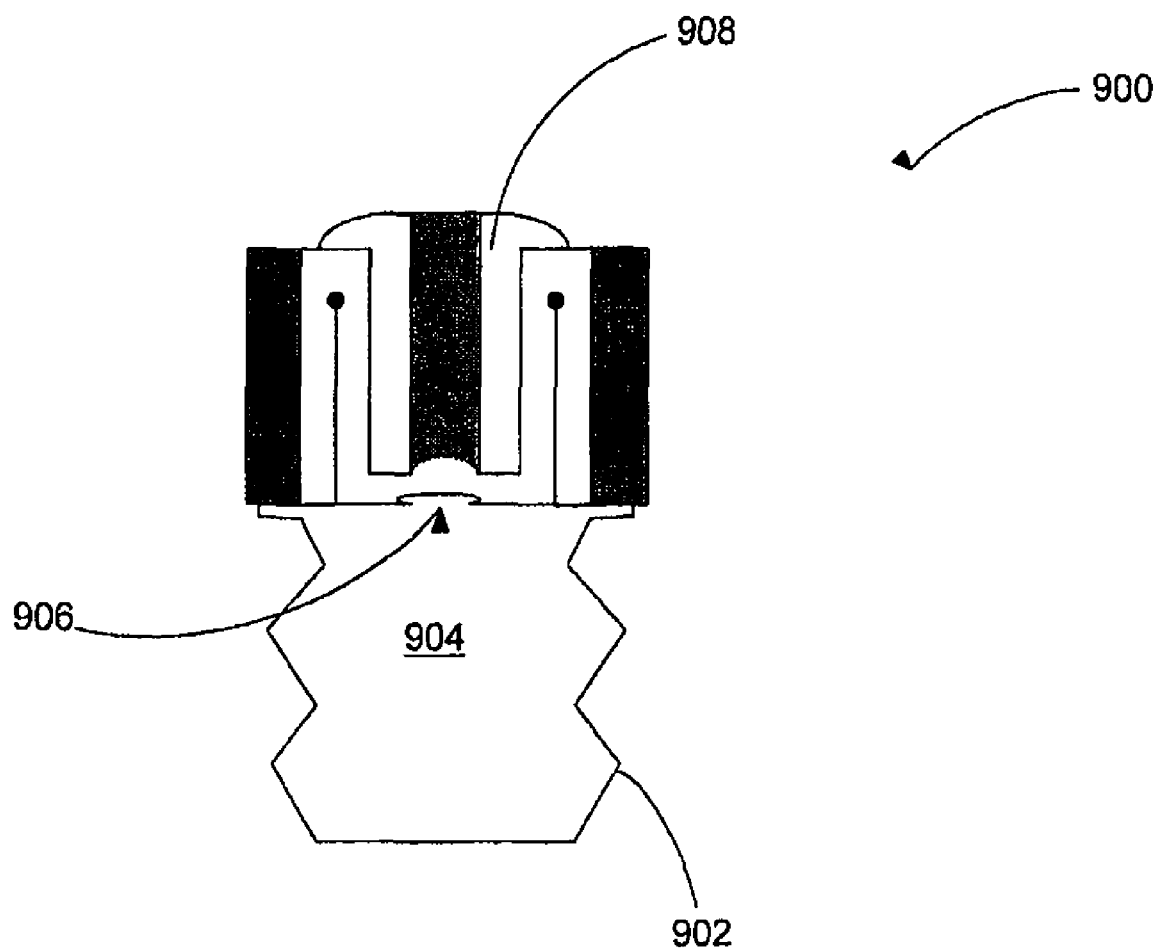

FIG. 9 illustrates yet another battery cell 900, which includes a bellows 902 surrounding an electrolyte 904, a diaphragm 906, and a rivet 908. In operation, cell 900 is activated by forcing rivet through burst diaphragm 906 to allow electrolyte 904 to contact the battery electrodes.

Figure 10A:
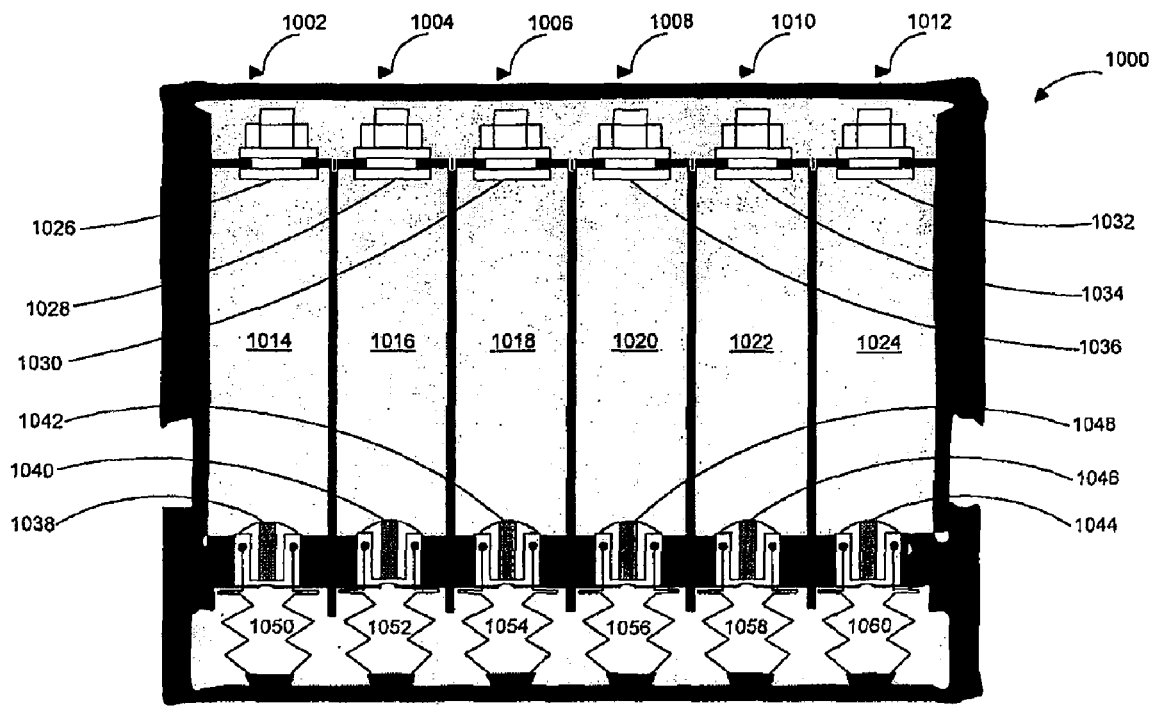
Figure 10B:
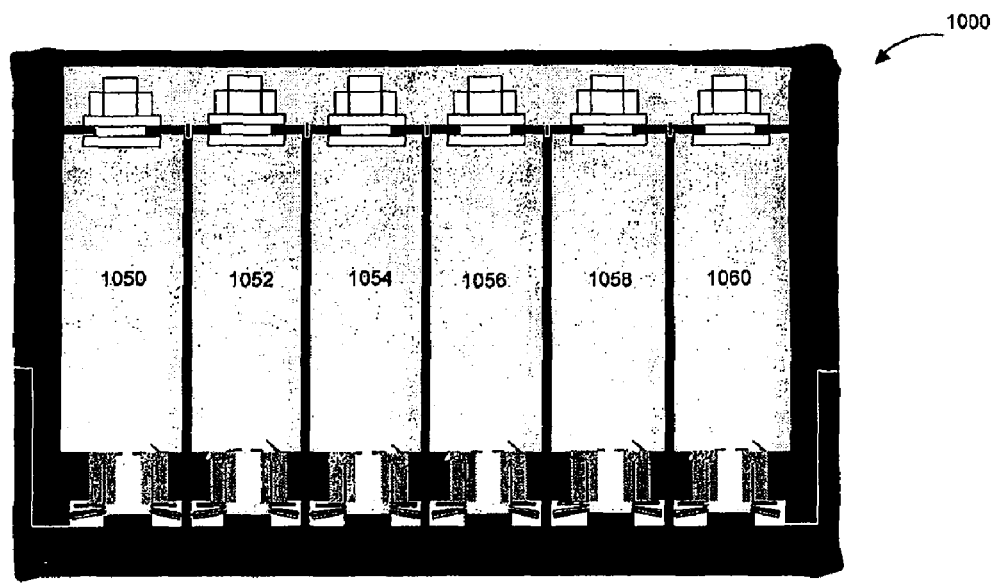

FIGS. 10(a) and 10(b) illustrate a multiple-cell battery 1000—in accordance with yet additional exemplary embodiments of the invention—prior to and after activation of the battery, respectively. Battery 1000 includes cells 1002, 1004, 1006, 1008, 1010, and 1012, which each includes a cavity 1014, 1016, 1018, 1020, 1022, and 1024, and an electrode 1026, 1028, 1030, 1032, 1034, and 1036 and an electrode 1038, 1040, 1042, 1044, 1046, and 1048. Electrolyte 1050, 1052, 1054, 1056, 1058, and 1060 is allowed to flow into the respective cavity 1014, 1016, 1018, 1020, 1022, and 1024 by collapsing a bottom tray of the battery.

A cathode, in accordance with various embodiments of the invention, is formed by providing a substrate such as aluminum or aluminum coated with electrically conducting material such as carbon. A slurry including sulfur, a metal oxide, binder, a solvent, and electrically conductive carbon is formed, and the slurry is applied to the substrate, such that when the solvent evaporates a layer including sulfur and metal oxide, having a thickness of about 40 μm to about 50 μm remains on the substrate. In accordance with various aspects of these embodiments, about 0.001% to about 10% of a polymeric material, such as polyamide material is added, in powder form, to the slurry prior to application of the slurry to the substrate.

The batteries of the present invention, both with and without reserve design, possess the performance to be useful in many applications. The batteries may be particularly useful for military applications, with sufficient power density to replace currently used lithium-alloy/iron disulfide thermal batteries, and sufficient energy to replace currently used lithium/sulfur dioxide primary batteries.

Although the present invention is set forth herein in the context of the appended drawing figures, it should be appreciated that the invention is not limited to the specific form shown. For example, while invention is conveniently described in connection with particular metal oxides, polymeric materials, and a separator containing inorganic fillers, the invention is not so limited. Furthermore, although the reserve battery is described in connection with specific configurations, the invention is not limited to the illustrated examples. Various modifications, variations, and enhancements in the design and arrangement of the method and apparatus set forth herein, may be made without departing from the spirit and scope of the present invention as set forth in the appended claims.

We claim:

1. A lithium-sulfur battery, comprising:
   an anode comprising lithium;
   a non-aqueous electrolyte;
   a cathode comprising a composition including sulfur and a metal oxide; and
   a separator comprising polymeric material and about 5 to 50% organically modified clay.

2. The lithium-sulfur battery of claim 1, wherein the metal oxide is selected from the group consisting of CuO, $Bi_2O_3$, SnO, ZnO, and $Mn_2O_3$.

3. The lithium-sulfur battery of claim 2, wherein the metal oxide is zinc oxide.

4. The lithium-sulfur battery of claim 2, wherein the metal oxide is copper oxide.

5. The lithium-sulfur battery of claim 1, wherein the composition comprises about 20 weight percent to about 90 weight percent sulfur.

6. The lithium-sulfur battery of claim 1, wherein the composition comprises about 0.001 to about 50 weight percent metal oxide.

7. The lithium-sulfur battery of claim 6, wherein the composition comprises about 20 to about 25 weight percent zinc oxide.

8. The lithium-sulfur battery of claim 6, wherein the composition comprises about 20 to about 25 weight percent copper oxide.

9. The lithium-sulfur battery of claim 1, wherein the composition further comprises a polymeric material.

10. The lithium-sulfur battery of claim 9, wherein the composition comprises about 0.001 to about 10 weight percent polymeric materials.

11. The lithium-sulfur battery of claim 9, wherein the polymeric material comprises polyamide material.

12. The lithium-sulfur battery of claim 1, further comprising a barrier isolating at least a portion of the electrolyte.

13. The lithium-sulfur battery of claim 12, further comprising a cavity and a diaphragm interposed between the cavity and the electrolyte.

14. The lithium-sulfur battery of claim 12, further comprising a gas generator.

15. A cathode suitable for a lithium-sulfur battery, the cathode comprising:
   a substrate;
   a layer overlying at least a portion of the substrate, the layer comprising about 20 to about 90 weight percent sulfur and about 17 to about 32 weight percent zinc oxide.

16. The cathode of claim 15, wherein the layer further comprises about 0.001 to about 10 weight percent polymeric material.

17. The cathode of claim 16, wherein the polymeric material comprises polyamide material.

18. The cathode of claim 15, further comprising a separator, the separator comprising inorganic fillers.

19. A lithium-sulfur battery, comprising:
   an anode comprising lithium;
   a non-aqueous electrolyte; and
   a cathode comprising a composition including sulfur and about 17 to about 32 weight percent zinc oxide; and
   a separator interposed between the anode and the cathode, the separator comprising about 5 to 50% organically modified clay.

* * * * *

UNITED STATES PATENT AND TRADEMARK OFFICE
CERTIFICATE OF CORRECTION

| | | |
|---|---|---|
| PATENT NO. | : 8,252,461 B2 | Page 1 of 1 |
| APPLICATION NO. | : 12/396118 | |
| DATED | : August 28, 2012 | |
| INVENTOR(S) | : Vu et al. | |

It is certified that error appears in the above-identified patent and that said Letters Patent is hereby corrected as shown below:

On the title page please amend the 4th inventor's name as follows:

Item (75), please change "Ernest Mdzebet, Joplin, MO (US)" to --Ernest Ndzebet, Joplin, MO (US)--

Signed and Sealed this

Thirteenth Day of November, 2012

David J. Kappos
*Director of the United States Patent and Trademark Office*